May 29, 1956  P. M. SCHUFTAN ET AL  2,747,681
REGENERATION OF ADSORBENT UNITS
Filed Aug. 30, 1952
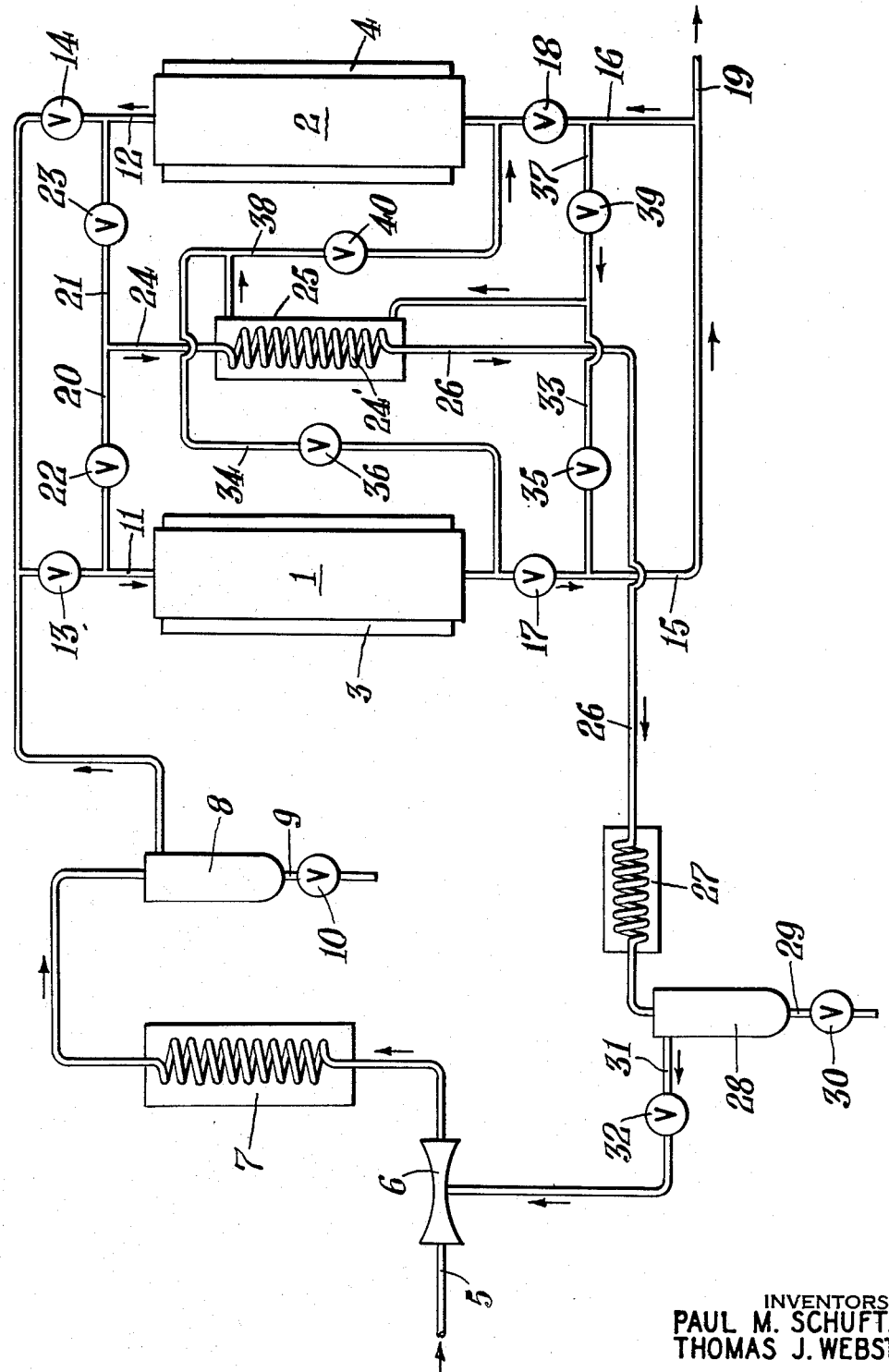
INVENTORS
PAUL M. SCHUFTAN
THOMAS J. WEBSTER
BY D.C. Harrison
ATTORNEY

2,747,681

REGENERATION OF ADSORBENT UNITS

Paul Maurice Schuftan, Richmond Hill, and Thomas John Webster, London, England, assignors to The British Oxygen Company Limited, a British company Application August 30, 1952, Serial No. 307,218

Claims priority, application Great Britain September 5, 1951

2 Claims. (Cl. 183—4.7)

This invention relates to the separation of a minor component from a gas by adsorption and relates more particularly to a method of regenerating the adsorbent in an adsorbent unit such as specifically a gas drier of the type in which the gas to be dried passes at superatmospheric pressure and at ambient or reduced temperature through a bed of alumina or other granular adsorbent material contained within a shell, and which forms one of a pair of similar driers, one of which is regenerated by heating whilst the other is operating, the two driers being changed over after a predetermined time.

Heretofore, the regeneration of such adsorbent units has been a slow process comprising the steps of depressurizing the unit; heating it to the regeneration temperature by passing a heated gas upwardly through the bed; cooling the bed by means of an upflowing stream of a cooling gas; and repressurizing the unit.

The rate of heating of the adsorbent bed to the reactivation temperature depends on the rate of passage of the heating gas through the bed and this is limited as the velocity of the heating gas must not exceed the value at which it would lift the individual granules forming the bed. The rate of heating can be increased by supplying heat directly to the adsorbent or the outer shell of the unit, but the low conductivity of the adsorbent and the low specific heat of the regenerating gas coupled with the fact that no portion of the adsorbent must be heated above a certain critical temperature still place severe limitations on the rate at which the heating can be accomplished.

The rate at which the adsorbent bed can be cooled is similarly limited by the granule lifting velocity of gas passing upwards through the adsorbent.

Finally, the steps of alternately depressurizing and repressurizing must also be carried out slowly to avoid disintegration of the adsorbent. These steps also result in increased power consumption and in a fluctuation of the supply rate of the dried gas.

Thus all these operations tend to increase the time required to regenerate the unit. The working cycle of an adsorption system and therefore the size of the adsorption units is fixed by the time required for regeneration; if the rate of regeneration can be increased, a reduction in the size of the units required for a particular duty is possible. It is particularly important where large quantities of high pressure gas have to be treated to limit as far as possible the size of the units required.

It is also frequently desirable that the temperature, pressure and flow rate of the gas leaving an adsorption unit should remain constant; this is of major importance where the unit forms part of a gas separation plant.

Finally, in treating a rare or expensive gas it is undesirable to allow the gas to become contaminated by any other gas which might be used for regenerating the adsorbent. In such cases also it is essential not to lose any of the gas being treated.

It is an object of the present invention to provide a method of regeneration in which the necessity for depressurizing the adsorbent vessel being used for treating a gas under pressure is eliminated and in which the rate of heating and cooling the adsorbent is substantially increased, thus reducing the time required to complete the regeneration procedure and enabling a smaller adsorption unit to be used for any given purpose.

According to the present invention, a process for the reactivation of an adsorbent unit such as a gas drier of the type specified comprises a heating stage in which the adsorbent material is heated under substantially the pressure at which the drying is carried out until the desired regeneration temperature has been reached, a flushing stage in which the residual water is removed by passing a small amount of the dry gas leaving the operating drier at the same pressure through the drier, and a cooling stage in which the passage of dried gas through the drier is continued until the temperature of the drier is substantially equal to the drying temperature. The flushing and drying gas will usually be passed upwardly through the drier, but may be passed downwardly therethrough if desired.

Preferably, the temperature of the flushing gas and the rate of heat influx over the length of the drier are so adjusted as to keep the temperature of the adsorbent substantially constant during the flushing stage. For example, the flushing gas may be heated prior to its entry into the drier by heat exchange with the hot gas leaving the drier.

When drying a gas, the steam and gas leaving the drier during the three regeneration stages are preferably passed through a cooler to remove the water, the residual gas thereafter being recirculated to the inlet of the operating drier. Such recirculation can conveniently be effected by a suitable gas pump or by a venturi inserted in the gas inlet line to the driers. Since the hot gas leaving the drier is cooled prior to its recirculation, fluctuations in the temperature of the gas entering the operating drier are avoided and the temperature of the dried gas leaving the drying unit remains substantially constant. Moreover, the flow rate of the dried gas is not reduced during the flushing and cooling stages since the gas withdrawn is recirculated to the inlet line to the driers. This recirculation of the gas is particularly useful where rare or expensive gases are treated since no gas is lost during regeneration.

The adsorbent is preferably heated through the shell of the adsorbent vessel, for example, by means of an electric heating coil surrounding the shell, but any other suitable method may be employed, such as, for example, a heating coil embedded in the adsorbent itself or by dielectric heating.

By employing the method of the present invention, the time taken in both the heating and cooling stages may be minimized and the time necessary for depressurizing and repressurizing the drier is eliminated. The consequent decrease in the total time required to regenerate the adsorbent enables smaller units to be used for a given purpose.

The above and other objects and advantages of this invention will become apparent from the following description and the accompanying drawing which illustrates diagrammatically a pair of adsorption units for drying a gas arranged to be regenerated by the method of the present invention.

The driers 1 and 2 are provided with electrical shell heaters 3 and 4 respectively, each of sufficient capacity to heat the shell of the drier to the reactivation temperature in a reasonably short period of time. In order to ensure that the temperature of the drier shell does not exceed the regeneration temperature, an automatic cut-out may be included in the heater circuit.

The inlet pipe 5 for the gas to be dried leads through a venturi nozzle 6 and vaporization cooler 7 to a water separator 8 provided with a drain pipe 9 controlled by valve 10. The separator 8 is connected to the inlets of driers 1 and 2 by branch pipes 11 and 12 controlled by valves 13 and 14 respectively. The outlets of the driers 1 and 2 are connected by branch pipes 15 and 16 controlled by valves 17 and 18 respectively to the main outlet line for the dried gas 19.

From the inlets 11 and 12 of the driers 1 and 2, branch pipes 20 and 21 controlled by valves 22 and 23 respectively connect through pipe 24 to one pass 24' of a heat exchanger 25 and from thence through pipe 26 to a water-cooled cooler 27 and a water separator 28 provided with a drain pipe 29 controlled by a valve 30. From the separator 28, a pipe 31 leads through valve 32 to the throat of the venturi nozzle 6.

The two ends of the other pass of the heat exchanger 25 are connected by pipes 33 and 34 controlled by valves 35 and 36 respectively to the branch pipe 15 across valve 17, and similarly by pipes 37 and 38 controlled by valves 39 and 40 to branch pipe 16 across valve 18.

In operation, when drier 1 is on stream for operation to dry the gas while drier 2 is being regenerated as shown in the drawing, valves 13, 17, 23, and 32 are opened while valves 14, 18, 22, 35, 36, 39, and 40 are shut, so that all the gas to be dried passes through branch pipe 11 to the drier 1 and then out through valve 17 to pipe 19. The shell heater 4 of drier 2 is then switched on and the adsorbent allowed to reach the regeneration temperature. The high pressure residual gas present in the drier greatly accelerates the rate of passage of heat from the shell to the adsorbent mass and ensures that the central layers of adsorbent reach the regeneration temperature after a relatively short heating period. During the heating, the expanding gas within the drier and the steam formed by the evaporation of the adsorbed water are drawn by suction from the throat of the venturi 6 through branch pipe 21, pipe 24, pass 24' of heat exchanger 25, and pipe 26 to the cooler 27 where the steam is condensed, and thence to the water separator 28 where the condensed water is separated. The gas thus freed from the water rejoins the main stream of gas to be dried passing through the venturi 6. The pressure in the drier 2 remains approximately constant apart from the slight pressure drop (which need not be more than about 5 ats.) produced by the venturi suction.

After the heating has been continued for a sufficient time to allow the central layers of the adsorbent bed to reach the regeneration temperature, the residual moisture is flushed out of the drier by opening valves 39 and 40 for a short period so as to allow a small amount of the dry gas from pipe 19 to be drawn through branch pipe 16 and pipe 37 to the heat exchanger 25 and thence through pipe 38 to the lower end of the drier 2. This gas is drawn upwardly through the adsorbent bed carrying with it the remaining water and is then recirculated as before through the cooler 27 and separator 28 to the venturi 6. During its passage through the heat exchanger 25, the flushing gas is heated by indirect heat exchange with the hot gases from the top of the drier also passing through pass 24' of the heat exchanger, and by suitable adjustment of the heater 4, the temperature of the adsorbent bed may readily be maintained constant at the regeneration temperature during the flushing period.

After flushing is completed, valves 39 and 40 are closed, the shell heater 4 is switched off and the drier is cooled by opening the outlet valve 18 so that a stream of the cold, dried gas is drawn directly by the venturi suction upwardly through the drier 2. The hot gas leaving the top of the drier is recirculated as before to the cooler 27 and thence to the throat of the venturi 6. Since the cooling gas stream is recooled before rejoining the main stream of gas to be dried, fluctuations in the temperature of the gas entering the operating drier 1 are avoided and the temperature of the dried gas leaving the unit remains constant. The rate of passage of dried gas from the drying unit is not reduced by the withdrawal of the flushing and cooling gas as the quantity of gas withdrawn is small as compared with the total gas throughout and this gas is moreover recycled to the inlet line to the driers. The venturi is designed to recycle the gas at a rate sufficient to cool the drier in a reasonably short period of time and no special gas flow indicator is necessary.

After cooling is completed, valves 23 and 32 are closed and the water is drained from the separator 28 by opening valve 30.

In order to change over the driers, it is then necessary only to open valve 14 and to close valves 13 and 17 when the gas to be dried is diverted through drier 2. The regeneration of drier 1 can then be commenced by opening valves 22 and 32 and switching on the heater 3. Instead of the venturi 6, a reciprocating or rotary gas pump or blower can be interposed in the pipe 31 or pipe 26 to avoid the pressure drop in the main gas stream caused by the venturi.

While the invention has been described in connection with a specific example of drying a gas, it is contemplated that the principles of the invention may be employed for the separation of materials other than water vapor from gases such as the separation from a valuable gas of gaseous components which are selectively adsorbable therefrom by specific adsorbent materials suitable for such use. It is therefore intended to cover all changes and modifications of the example herein described for purposes of illustration which are within the spirit and scope of the invention.

We claim:

1. An apparatus for the regeneration of adsorbents in a raw gas treating plant including two adsorbent holding chambers connected for alternate operation, said chambers each having untreated raw gas inlets connected to a raw gas supply, treated gas outlets, stop valves interposed in the inlets and outlets, and means associated with each chamber for controllably heating the adsorbent therein; said apparatus comprising a heat exchanger having a warm end and a cold end and passages therebetween in heat exchange relation for gas to be heated and gas to be cooled; means connecting the warm end of the passage for gas to be cooled to either of said inlets on the chamber sides of the inlet valves; means connecting the cold end of said passage for gas to be cooled to a purge gas conduit; valved conduit means connecting the cold end of the passage for gas to be heated to either of the outlets of said chambers on the downstream sides of the outlet valves; and valved conduits connecting the warm end of said passage for gas to be heated to either of the outlets of said chambers upstream of said outlet valves, the valves being operable to pass gas from the inlet of the chamber to be regenerated through said passage for gas to be cooled to the purge gas conduit, and to pass a portion of treated gas from the outlet of the operating chamber, through said passage for gas to be warmed to the outlet of the chamber being regenerated.

2. An apparatus according to claim 1 which includes an apparatus connected to said purge gas conduit for removing at least a substantial portion of the desorbed material from the purge gas delivered thereto by said purge gas conduit; and means for passing the treated purge gas to said raw gas supply.

References Cited in the file of this patent

UNITED STATES PATENTS

| | | |
|---|---|---|
| 1,548,280 | Ray | Aug. 4, 1925 |
| 1,661,104 | Barnebey | Feb. 28, 1928 |
| 1,934,075 | Lewis | Nov. 7, 1933 |
| 1,948,779 | Abbott et al. | Feb. 27, 1934 |
| 2,083,732 | Moore et al. | June 15, 1937 |
| 2,345,774 | Simpson | Apr. 4, 1944 |
| 2,494,644 | Clement | Jan. 17, 1950 |
| 2,535,902 | Dailey | Dec. 26, 1950 |
| 2,621,752 | Riley | Dec. 16, 1952 |
| 2,625,237 | Gribler et al. | Jan. 13, 1953 |
| 2,665,769 | Walker et al. | Jan. 12, 1954 |